United States Patent
Olaniyan

(10) Patent No.: US 8,533,009 B2
(45) Date of Patent: *Sep. 10, 2013

(54) METHOD AND SYSTEM FOR MANAGING APPEALS

(71) Applicant: Olakunle Olaniyan, Clarksville, MD (US)

(72) Inventor: Olakunle Olaniyan, Clarksville, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 13/760,010

(22) Filed: Feb. 5, 2013

(65) Prior Publication Data

US 2013/0159025 A1     Jun. 20, 2013

Related U.S. Application Data

(63) Continuation-in-part of application No. 11/655,391, filed on Jan. 18, 2007, now Pat. No. 8,392,207.

(51) Int. Cl.
*G06Q 40/00* (2012.01)
(52) U.S. Cl.
USPC ................................................................. 705/4
(58) Field of Classification Search
USPC ........................................................ 705/2–4
See application file for complete search history.

(56) References Cited

U.S. PATENT DOCUMENTS

| | | | | |
|---|---|---|---|---|
| 2001/0034621 A1* | 10/2001 | Kirsh et al. | ......................... | 705/4 |
| 2003/0191665 A1* | 10/2003 | Fitzgerald et al. | ................. | 705/2 |
| 2004/0249665 A1* | 12/2004 | David | .............................. | 705/2 |
| 2005/0060185 A1* | 3/2005 | Balogh | ............................. | 705/2 |
| 2005/0137912 A1* | 6/2005 | Rao et al. | ........................... | 705/4 |
| 2006/0041487 A1* | 2/2006 | Santalo et al. | .................. | 705/30 |
| 2006/0047561 A1* | 3/2006 | Bolton | ............................ | 705/10 |

* cited by examiner

*Primary Examiner* — Joseph Burgess
(74) *Attorney, Agent, or Firm* — IM IP Law PLLC; C. Andrew Im

(57) ABSTRACT

A system and method for managing insurance claim denials. The system and method reviews a denial of claim from an insurer and a patient medical record received from a healthcare provider to determine if an appeal should be filed for the denial. It prepares an appeal to the denial comprising an appeals overturn letter and supporting document and submits the appeal to the insurer if it determines that an appeal should be filed. The system then tracks and monitors the progress of the appeal and process the appeal determination received from the insurer. The system utilizes these tracking and monitoring information to streamline and improve the insurance claim process of the healthcare provider, such as developing and implementing claim denial reduction program.

20 Claims, 9 Drawing Sheets

METHOD AND SYSTEM FOR MANAGING APPEALS

RELATED APPLICATION

The present application is a continuation-in-part application of U.S. application Ser. No. 11/655,391 filed Jan. 18, 2007, which is incorporated by reference in its entirety.

BACKGROUND OF THE INVENTION

This invention relates to a method and system for managing appeals, more particularly, this invention relates to a method and system for managing managed care denials for healthcare providers.

With the advent of managed care, hospitals, physician practices, dental practices and other healthcare providers (collectively referred to herein as the "healthcare provider") often have payments for claims denied by health insurance companies for a variety of reasons. Generally, when a healthcare provider's claims are denied, the healthcare provider has the ability to appeal the denial to the health insurance company that issued the denial. Upon receipt of a written appeal or grievance, the insurance company or an insurance plan administer must review the appeal and make a decision regarding its approval or denial.

One example is medical insurance coverage plans. State and federal laws, as well as contractual provisions, allow both those insured (consumers) and healthcare providers (e.g., doctors, dentists, hospitals, physical therapists, medical clinics, etc.) the right to file appeals with the insurance companies when the insurer has denied a request or benefit. A consumer appeal arises when a request for approval to receive medical treatment is denied or a claim is not paid correctly. A healthcare provider may file an appeal on behalf itself or the patient when an insurer has not properly paid for a particular service rendered. Upon receipt of a written appeal, the insurer must review the appeal and make a decision regarding its approval or denial.

In a typical denial of a request for medical services, a patient and a healthcare provider determine the need for a medical service and the healthcare provider contacts the insurance company to request preauthorization for that service. After the healthcare provider has treated the patient, a claim for payment of those services is submitted to the patient's insurance company. The claim must be submitted on the appropriate claims submission form. Insurance companies require that a completed claim form be submitted with all of the requisite information, such as, patient's name and address, diagnosis, date of service, procedures or services provided utilizing standardized codes and descriptions (e.g., CPT codes), cost of service, etc.

If the claim does not meet the specified criteria of the insurer, the insurance company can deny or make only partial payment to the healthcare provider. The healthcare provider receives an explanation of payment outlining what was paid on the claim or the reasons why the claim was denied or partially paid. A description of the provider's right to appeal may be included in the correspondence from the insurance company. While the patient typically does not receive notification why a healthcare provider's request for payment for a medical service has been denied, she is often billed by the healthcare provider when the insurance company does not pay. In many instances, claims are denied because information is missing from the claim form or the insurance company has the wrong information about healthcare provider or patient.

The healthcare provider can appeal claim denial or payment reduction on behalf of the patient or itself. If the healthcare provider is appealing on behalf of a patient for a medical service request denial, the process is generally the same as an appeal lodged by the patient. For example, the healthcare provider can lodge an appeal when a confusing or incorrect explanation of benefit ("EOB") is received from the insurance company. An EOB is typically sent to the healthcare provider by the insurer explaining the payment(s) for submitted claims. The EOB is generally coded by the insurer's claims processing system and lists the reason(s) for the claims denial or partial payment. However, these EOB codes are not standardized in the healthcare industry.

Typically, the healthcare provider initiates an appeal by contacting the claims department of the appropriate insurance company. Generally, the healthcare provider has the right to appeal if and when: the appeal is on behalf of the patient for any reason; the insurer has denied the patient coverage for a service based on medical necessity; and a medical service claim payment has been denied, partially denied and/or paid incorrectly.

Patients generally submit a health insurance appeal for denial of a request for a medical service or claims payment. Once the patient and healthcare provider determine the need for a medical service, the healthcare provider contacts the insurer to request pre-authorization for that service. Upon receipt, the insurer initiates a pre-certification review to determine if the medical service request will be approved. The insurance company must send notification of any denial to the patient and the requesting healthcare provider and informs the patient that she has the right to appeal the decision. The insurer is required by law to outline the appeal process.

One of the most common reasons a medical service request is denied is because the insurer concludes that the medical service request is "not medically necessary." This typically occurs because the healthcare provider and/or patient has not provided all of the necessary information or the treatment provided does not meet the insurers guidelines. Most insurers utilize nationally recognized standards of medical care and criteria to guide their medical decision-making. A medical director, who is a licensed physician, reviews all medical service request denials that are based on "medical necessity." When a patient or healthcare provider appeals a medical service request denial and provides additional or missing information, the majority of denials are overturned and the request for service approved.

Also, appeals can be triggered when patients receive a bill from their healthcare providers, who have not received reimbursement from the insurance company for services already provided. Typically, healthcare providers are not legally or contractually permitted to bill patients for more than the co-payment or deductible. However, often correspondence from a collection agency is the first notification for patients that the insurance company has denied their healthcare providers' service claim.

The appeal determination is made and the patient and/or healthcare provider is notified of the decision. If the denial is overturned, the patient is allowed to receive the requested service(s) and/or the healthcare provider is paid. If the appeal is upheld or affirmed, the patient and/or healthcare provider is then notified of the procedures for a secondary review. Typically, the third and final level of appeal includes external reviewers.

Many businesses or industries have regulated or contractual appeals or grievance process allowing a user or a customer the opportunity to challenge the denial of a service or benefit. However, these appeals or grievance processes uniformly suffer from lack of automation and standardization. Instead, the appeal or dispute is submitted in paper form and without the benefit of standardized nomenclature or data format. Accordingly, the claimed invention proceeds upon the desirability of providing an automated process for managing such appeals.

OBJECTS AND SUMMARY OF THE INVENTION

Hospitals and other healthcare providers typically have a high amount of receivables and lose a significant amount of money on non-collected or denied claims because of the administrative burden and expense of filing an appeal. Many healthcare providers are not familiar with the appropriate procedure for appealing a payment denial and simply resubmit the bill. Furthermore, many healthcare providers typically have a limited number of staff members for billing and appealing issues, and do not have sufficient resources for following up on these filed appeals.

Therefore, it is an object of the claimed invention to provide a method and system for managing the appeal process to reduce the number of claims denials for healthcare providers before they occur.

It is another object of the claimed invention to provide a method and system as aforesaid that assists healthcare providers in recovering unpaid claims by significantly increasing the success rate of appeals for denied claims. In accordance with an exemplary embodiment of the claimed invention, the method and system provides a staged approach for managing appeals.

In accordance with an exemplary embodiment of the claimed invention, a method and system processes and manages the healthcare or managed care denials for hospitals and other healthcare providers (hereinafter "healthcare provider"). The claimed invention allows an investigator to efficiently investigate and appeal a denial of an insurance claim, and ensure that approved appeals are timely paid to the healthcare provider by the insurer.

In accordance with an exemplary embodiment of the claimed invention, the method and system develops a customized denial reduction program for healthcare providers on an individual basis based on the healthcare provider's appeal process and records, thereby reducing the number of denials received and minimizing the appeals burden on the healthcare provider.

Upon receiving denial notification and information transfer, in accordance with an exemplary embodiment of the claimed invention, an appeals coordinator can utilize the inventive system to evaluate the denial and associated information. The inventive system and method provides a recommendation to the appeals coordinator whether to pursue an appeal. If a decision is made to pursue the appeal, the inventive system generates and transmits an appeal overturn letter, a completed appeal form and supporting documents to the insurer. The supporting documents can include medical records, financial information and call tracking information. The inventive system has tools to enable the appeals coordinator to monitor the appeal process to ensure timely processing and completion of the appeal. Subsequent action is then determined by the inventive system based on the appeals decision matrix. Different steps can be employed by the inventive system depending on the outcome of the appeal, i.e., denied, partially denied, or approved.

In accordance with an exemplary embodiment of the claimed invention, the system for managing appeals and denials comprises a database. The database comprises a primary data entry portal, data selection tool, activity tracking tool, report generation and analysis tool, maintenance tool and data warehouse.

In accordance with an exemplary embodiment of the claimed invention, the method for managing insurance claim denials comprises the steps of reviewing a denial of claim from an insurer and a patient medical record received from a healthcare provider to determine if an appeal should be filed for said denial; preparing an appeal to the denial comprising an appeals overturn letter and supporting document; submitting the appeal to the insurer; monitoring the progress of the appeal; and processing appeal determination received from the insurer.

In accordance with an exemplary embodiment of the claimed invention, the system for managing insurance claim denials comprises a nurse review module, an appeals coordinating module, a managed cared organization (MCO) process management module and an appeal decision matrix module. The nurse review module reviews a denial of claim from an insurer and a patient medical record received from a healthcare provider to determine if an appeal should be filed for the denial, and prepares an appeal to the denial comprising an appeals overturn letter and supporting document. The appeals coordinating module for submitting the appeal to the insurer. The MCO process management module monitors the progress of the appeal. The appeal decision matrix module processes appeal determination received from the insurer.

In accordance with an exemplary embodiment of the claimed invention, the computer readable medium comprises code for managing insurance claim denials. The code comprises instructions for reviewing a denial of claim from an insurer and a patient medical record received from a healthcare provider to determine if an appeal should be filed for the denial; preparing an appeal to the denial comprising an appeals overturn letter and supporting document; submitting the appeal to the insurer; monitoring the progress of the appeal; and processing appeal determination received from the insurer.

In accordance with an exemplary embodiment of the claimed invention, a web-based method for managing insurance claim denials for a plurality of healthcare providers comprises comparing a claim denial of a healthcare provider to a denial status grid comprising a list of denial types and an appeal success rate for each denial type on the list by a review module of a server. The review module provides a recommendation to proceed with or to decline to proceed with an appeal of the claim denial based on the comparison and a patient record associated with said claim denial. The method further comprises the steps of determining to proceed with the appeal of the claim denial is based on the recommendation; preparing an appeals package comprising an appeals overturn letter and a supporting document in support of the appeal to said claim denial by the nurse review module of said server; and submitting the appeals package to an insurer associated with the claim denial by an appeals coordinating module of the server over said communications network to file the appeal of the claim denial. The process management module of the server monitors the progress of said appeal filed with said insurer by a process management module of said server. The appeals decision matrix module of the server processes an appeal determination received from the insurer, and determines whether to file a second level appeal when the appeal is denied or partially denied.

In accordance with an exemplary embodiment of the claimed invention, a web-based computer system for managing insurance claim denials over a communications network comprises a hardware server for managing claimed denials for a plurality of healthcare providers, a database and a plurality of processor based client devices. The hardware server comprises a review module, an appeals coordinating module, a managed care organization (MCO) process management module and an appeal decision matrix module. The review module compares a claim denial of a healthcare provider to a denial status grid comprising a list of denial types and an appeal success rate for each denial type on the list, provides a recommendation to proceed with or to decline with an appeal of the claim denial based on the comparison and a patient record associated with the claim denial. A determination to proceed with the appeal of the claim denial is based on the recommendation. The review module prepares an appeals package comprising an appeals overturn letter and a supporting document in support of the appeal to the claim denial. The appeals coordinating module submits the appeals package to an insurer associated with the claim denial over the communications network to file the appeal of the claim denial. The MCO process management module monitors the progress of the appeal filed with the insurer. The appeal decision matrix module processes appeal determination received from the insurer and determines whether to file a second level appeal when the appeal is denied or partially denied. The database for storing the claim denial, the patient medical record, the appeals package and the appeal determination. The processor based client devices for accessing the server over the communications network. Each client device associated with a health care provider.

Various other objects of the claimed invention will become readily apparent from the ensuing detailed description and from the accompanying figures.

BRIEF DESCRIPTION OF THE FIGURES

The following detailed description, given by way of example, and not intended to limit the claimed invention solely thereto, will best be understood in conjunction with the accompanying drawings in which like components or features in the various figures are represent by like reference numbers:

DETAILED DESCRIPTION OF THE EMBODIMENTS

With reference to the figures, exemplary embodiments of the invention are now described. These exemplary embodiments illustrate principles of the invention and should not be construed as limiting the scope of the invention.

The term "healthcare providers" as used herein includes but is not limited to hospitals, doctors, dentists, medical clinics, dental clinics, physical therapists and other healthcare providers.

A denial notification is the process whereby the healthcare provider receives notification of a denied claim from the insurer. Most state insurance regulations require that the denial notification be in writing. Information transfer is the process by which denial notification is received along with other information in the healthcare provider's possession, such as patient's medical records, that are necessary for a successful appeal.

Figure 9:
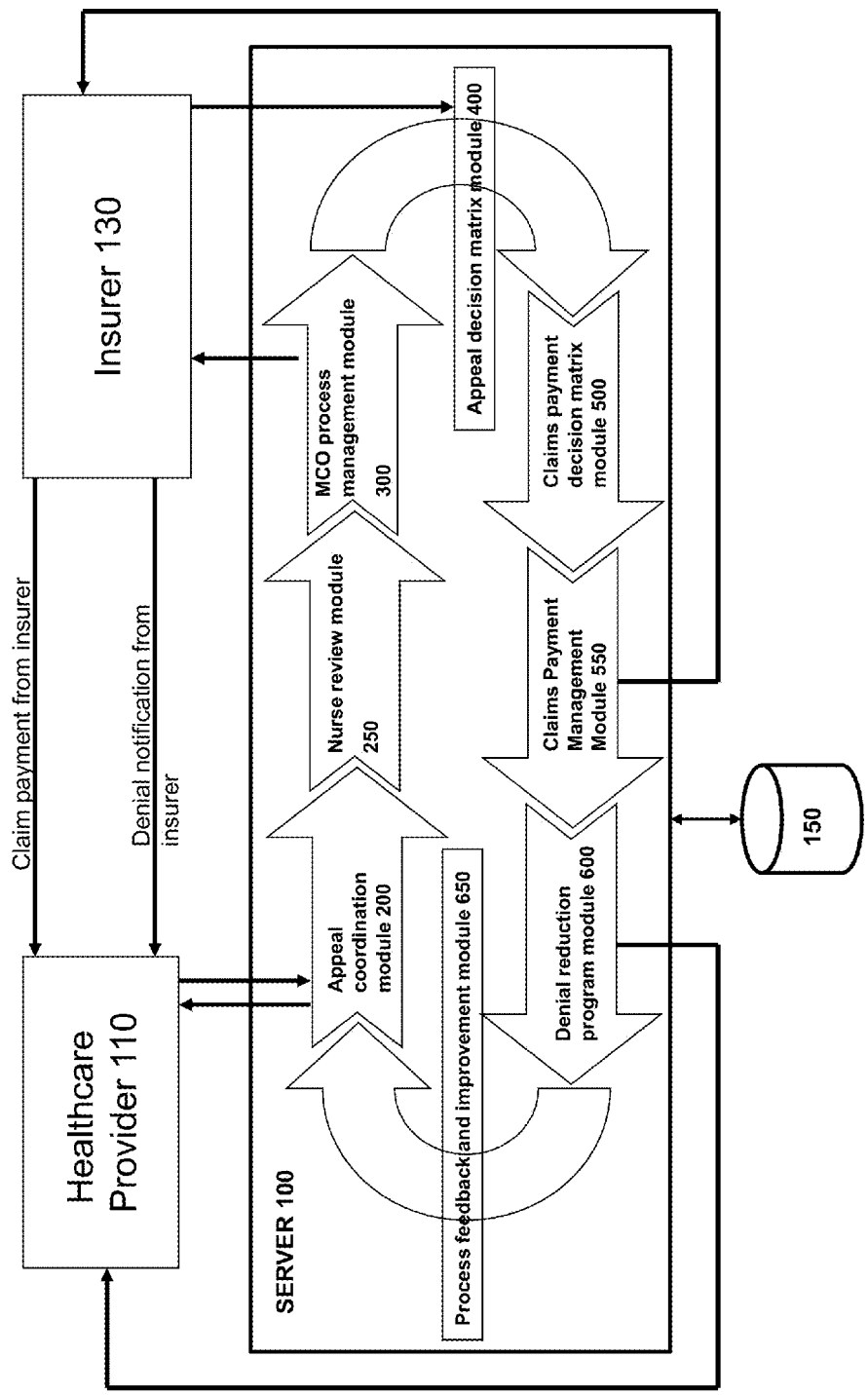
FIG. 9 illustrates a schematic diagram of the system in accordance with an exemplary embodiment of the claimed invention.

As exemplary shown in FIG. 9, the processor based server 100 implementing the claimed system and method is connected to one or more processor based client devices 110 (e.g., personal computers, laptops, tablets, smart phones, servers and the like) associated with one or more healthcare providers and one or more processor based devices 130 (e.g., computers, laptops, tablets, smart phones, servers and the like) associated with one or more insurers over a communications network, e.g., Internet. In accordance with an embodiment of the claimed invention, as shown in FIG. 9, the server 100 comprises an appeals coordinating module 200, a nurse review module 250, a MCO process management module 300, an appeals decision matrix module 400, a claims payment decision matrix module 500, a claims payment management module 520, a denial reduction program module 600 and a process feedback and improvement module 650. Preferably, in accordance with an exemplary embodiment of the claimed invention, the system and method provides web-based computer system and method for managing insurance claim denials for a plurality of healthcare providers.

In accordance with an exemplary embodiment of the claimed invention, as shown in FIG. 9, the system comprises a database 150 comprising a primary data entry portal, data selection tool, activity tracking tool, report generation and analysis tool, maintenance tool and data warehouse. The data entry tool of the primary data entry portal in accordance with an exemplary embodiment of the claimed invention can collect these type of information: names, unique identifiers, healthcare provider's name, facility names, diagnosis code, claim amount, denied amount, units/days denied, denial letter date, healthcare provider denial receipt date, system denial receipt date, system denial mail date, admission date, discharge date, regulatory compliance met, denial type, bed type (intermediate care unit (ICU), critical care unit (CCU), medical/surgery (medsurg)), amount overturned and days/unit overturned.

In accordance with an exemplary embodiment of the claimed invention, the activity tracking tool can collect activity tracking data such as, activity type (appeals activity, claims activity), activity subtype (level one appeal), actual event (denial mailed, Managed Cared Organization (MCO) called, etc.) and outcome tracking (approved, upheld, partial, etc.).

The report generation and analysis tool has the following exemplary capabilities for managerial reports: all appeals, appeals by MCO, hospital, physician, diagnosis or another combination of previously collected data, all open appeals, all closed appeals, all upheld appeals, all overturned appeals, all open appeals no response and all approved not paid.

In accordance with an exemplary embodiment of the claimed invention, information reports can be used to analyze long term trends and develop initiatives to improve the appeals process, such as, denial types by MCO, physician denials by diagnosis, MCO denial by diagnosis and timeliness data.

In accordance with an embodiment of the claimed invention, information reports can be generated for clients to update them on the status of their denials. These report can include information on the status of each appeal or appeals in aggregate, such as, all appeals status (mailed, responded, approved, partial, denied, paid), aggregate appeals status by payor, aggregate approvals and partials and aggregate denial upheld.

Actionable reports can be used to develop plans for clients to reduce denials. In accordance with an exemplary embodiment of the claimed invention, these actionable reports can include the following: denials by healthcare provider or physician, denials by insurer, denials by diagnosis, denials by denial type and insurer overturn activity.

In accordance with an exemplary embodiment of the claimed invention, the maintenance tool is used to maintain the database and change the components of the database that are visible to the user and data warehouse is a repository where the data components are stored.

Figure 1:
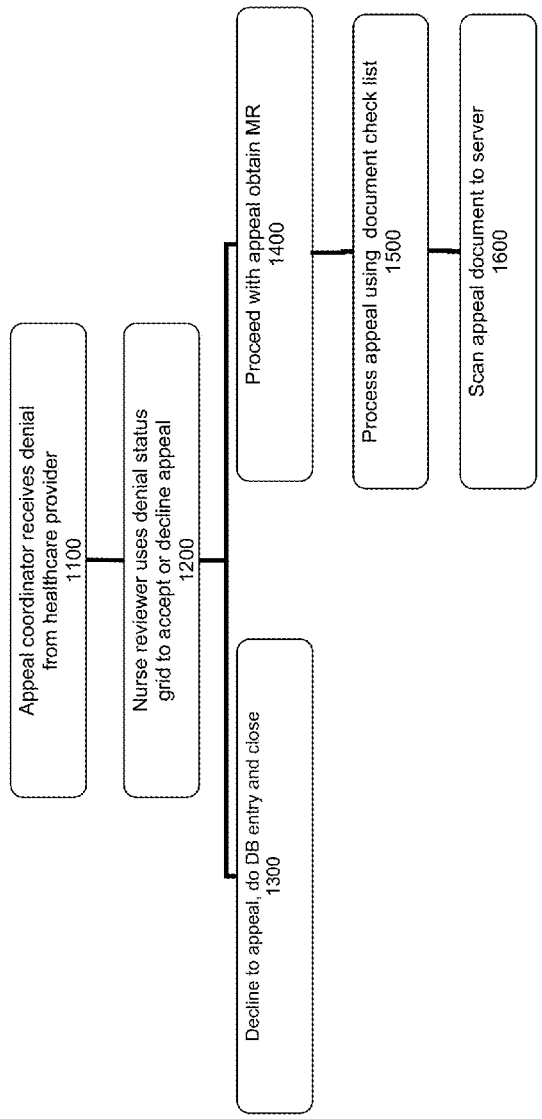
FIG. 1 illustrates the denial notification and information transfer process in accordance with an exemplary embodiment of the claimed invention.

In accordance with an exemplary embodiment of the claimed invention, the denial notification and information transfer process is now described in conjunction with FIG. 1. Once the healthcare provider receives a denial notification from the insurer, the client device 110 associated with the healthcare provider (or hereinafter the healthcare provider 110) sends a copy of the denial notification to an appeals coordinating module 200 so it can be reviewed by the appeals coordinator at step 1100. Preferably, the healthcare provider 110 also sends patient's medical records to the appeals coordinating module 200. The appeals coordinator can instruct the appeals coordinating module 200 to send a message or alert a nurse reviewer to conduct an initial review of the received denial notification. Additionally, the appeals coordinating module 200 sends electronic copies of the denial notification and the patient's medical record to a nurse review module 250. Alternatively, in accordance with an exemplary embodiment of the claimed invention, the health care provider can outsource the appeal process to a third-party service provider such that the denial notifications from the insurer can be sent directly to the third party service provider. In such an embodiment, the healthcare provider 110 can access the third party's server 100 over the communications network to monitor the status of the claim denial.

The nurse reviewer utilizes the nurse review module 250 to review and compare the denial notification and the medical records to a denial status grid at step 1200. In accordance with an exemplary embodiment of the claimed invention, the denial status grid comprises a list of denial types and the appeals success rates associated with these denial types. Based on the comparison, the nurse review module 250 provides a recommendation to the nurse reviewer whether to proceed with the appeal process or to decline the appeal. The nurse reviewer can make her decision to proceed with the appeals process based on the recommendation of the nurse review module 250 or can independently make her decision ignoring the nurse review module's recommendation.

If a decision is made to decline the appeal at step 1200, all the available information is entered into a database at step 1300 and no further work is done on that particular appeal.

However, if a decision is made to continue with the appeal at step 1200, the healthcare provider 110 is contacted and medical records are obtained at step 1400. Appeals coordinator utilizes the appeals coordinating module 200 to process the medical records and other documentation to ensure all needed documentation is claimed and arranged in a logical and orderly fashion using documentation check list template at step 1500. Once the documentation has been appropriately processed and organized, appeals are prioritized based on completion time frame, and primary demographic data is entered into the database. Appeals documentation and medical records are then scanned onto server 100 and the appeals coordinating module 200 notifies a head nurse reviewer of the assignments, preferably by phone or email, at step 1600.

Figure 2:
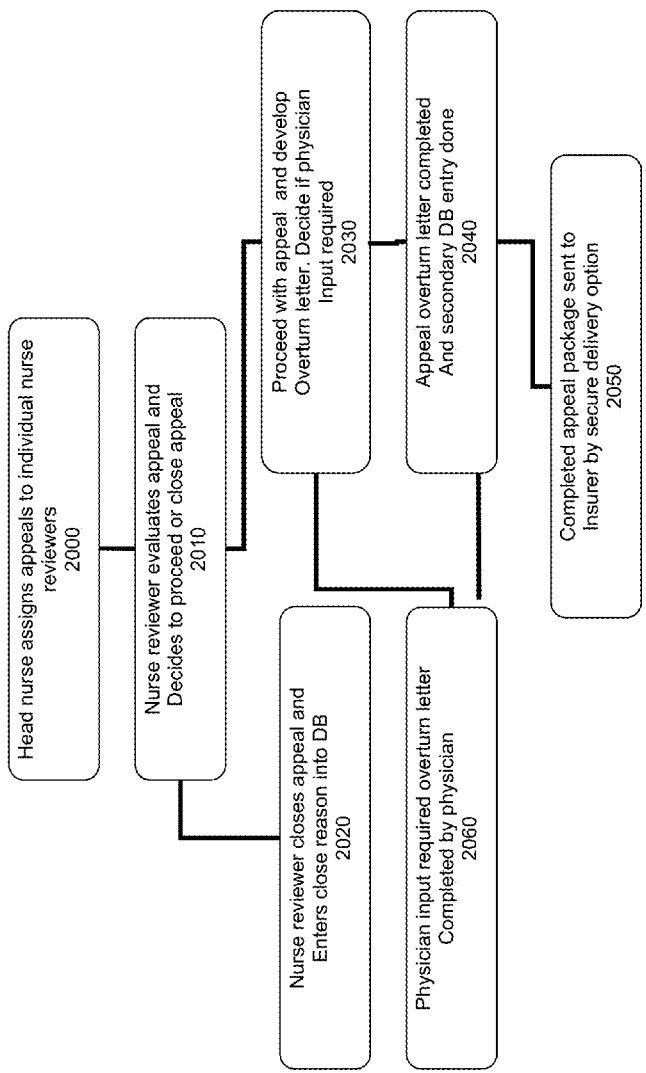
FIG. 2 illustrates the appeals processing and submission process in accordance with an exemplary embodiment of the claimed invention.

In accordance with an exemplary embodiment of the claimed invention, the appeals processing and submission process is now described in conjunction with FIG. 2. The inventive system generates the necessary documents for an appeal the information received from the healthcare provider 110. Typically, the appeals documents comprises a letter stating why the healthcare provider should be paid and supporting documents, such as medical records, financial information, call tracking information, etc. The head nurse reviewer using the nurse review module 250 assigns a nurse reviewer to each individual appeal based on the nurse reviewer's area of expertise and prior experience at step 2000.

The nurse reviewer in conjunction with the nurse review module 250 evaluates the medical records and all other available information at step 2010. Based on the review and the recommendation of the nurse review module 250, the nurse reviewer makes a decision to continue with the appeal or end the appeals process at step 2010. If nurse reviewer decides to end the process, the nurse review module 250 stores any additional information, including the specific reason for ending the appeal into the database at step 2020 and closes out the appeal. However, if nurse reviewer decides to continue the appeal, the nurse review module 250 and/or the nurse reviewer develops an appeal overturn letter at step 2030. Additionally, the nurse review module 250 and/or the nurse reviewer determines whether a physician input is required to conduct additional research to support the denial overturn argument at step 2030. If the inquiry of step 2030 is answered in the negative at step 2030 (that is, a physician input is not required), the nurse review module 250 completes the appeal and enters the information into the database at step 2040.

However, if the inquiry of step 2030 is answered in the affirmative (that is a physician input is required), the nurse review module 250 indicates that a specific research needed in appeal overturn letter. The nurse review module 250 assigns the appeal to a physician review folder and notifies the head reviewer requesting a physician review. Before the appeal is assigned to a physician for her input, a second nurse reviewer reviews the appeal and its corresponding supporting document. The second nurse reviewer either completes the appeal document or confirms the need for physician review and obtains a physician's input at step 2060. Once the appeal is completed, the nurse reviewer makes a secondary entry in the database at step 2040. Appeal specific information, including the appeal type, physician name, diagnosis, admission and discharge date, appeals completion date are all entered into the database.

The nurse review module 250 sends the completed appeal package, including the appeal overturn letter, to the appeals coordinating module 200 so it can be reviewed by the appeals coordinator. At the instruction of the appeals coordinator, the appeals coordinating module 200 submits the completed appeal package to the insurer 130 via a secure delivery system with delivery confirmation at step 2050. The database tracks the date of delivery to insurer 130. If a confirmation of receipt from the insurer is not received within a predetermined time period, the appeals coordinating module 200 resubmits the completed appeal package to the insurer 130.

Figure 3:
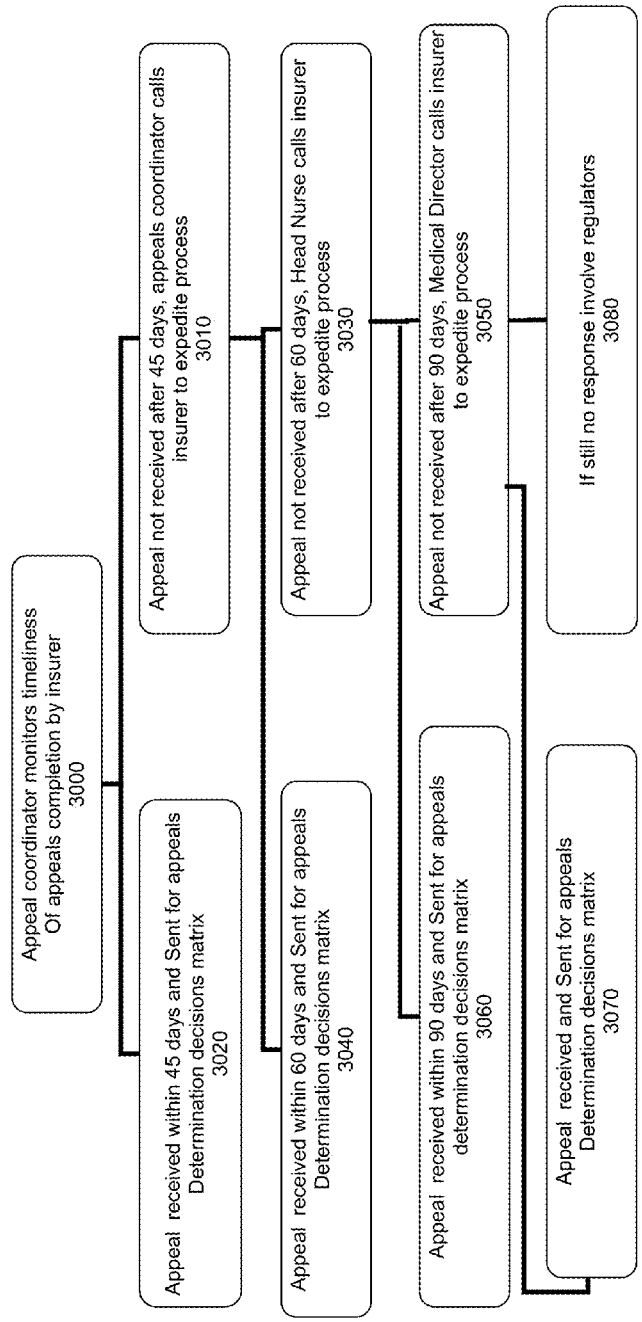
FIG. 3 illustrates the process for managing insurer's appeals in accordance with an exemplary embodiment of the claimed invention.

In accordance with an exemplary embodiment of the claimed invention, the process for managing the appeal process with the insurer is now described in conjunction with FIG. 3. The MCO process management module 300 monitors the timeliness and completion of each appeal by using the activity tracking system of the database at step 3000. The MCO process management module 300 can identify any appeals that have been with the insurer 130 for over 45 days and notify the appeal coordinator of any such delayed appeal at step 3010. The appeals coordinator can call the appeals customer service line of the insurer 130 to expedite the completion of such delayed appeals at step 3010. A response to an appeal received within 45 days, the MCO process management module 300 sends such received appeal to the appeals decision matrix module 400 at step 3020.

Additionally, the MCO process management module 300 uses the activity tracking system of the database to identify any appeals that have been with the insurer 130 for over 60 days and notifies the appeals coordinator of any such delayed appeal at step 3030. The appeals coordinator contacts a chief nurse reviewer who can call the insurer's appeal supervisor to expedite the completion of such delayed appeals at step 3030. A response to an appeal received within 60 days, the MCO process management module 300 sends such received appeal to the appeals decision matrix module 400 at step 3040.

A response to an appeal received within 90 days, the MCO process management module 300 sends such received appeal to the appeals decision matrix module 400 at step 3060. The MCO process management module 300 uses the activity tracking system of the database to identify any appeal that have been with the insurer 130 for over 90 days and notifies the appeals coordinator of any such delayed appeal at step 3050. The appeals coordinator then contacts a medical director who can call the insurer's medical director or other senior management personnel to expedite the completion of such delayed appeals at step 3050.

If a response to delayed appeal is finally received after contacting the insurer's medical director, the MCO process management module 300 sends such received appeal to the appeals decision matrix module 400 at step 3070. However, if no response is received from the insurer 130 after contacting the insurer's medical director, then the medical director contacts the state insurance regulators at step 3080.

Upon receipt of the appeals determination from the insurer 130, the appeals decision matrix module 400 enters the appeals determination and appeals timeliness information into the database and reviews the received appeals determination.

Figure 4:
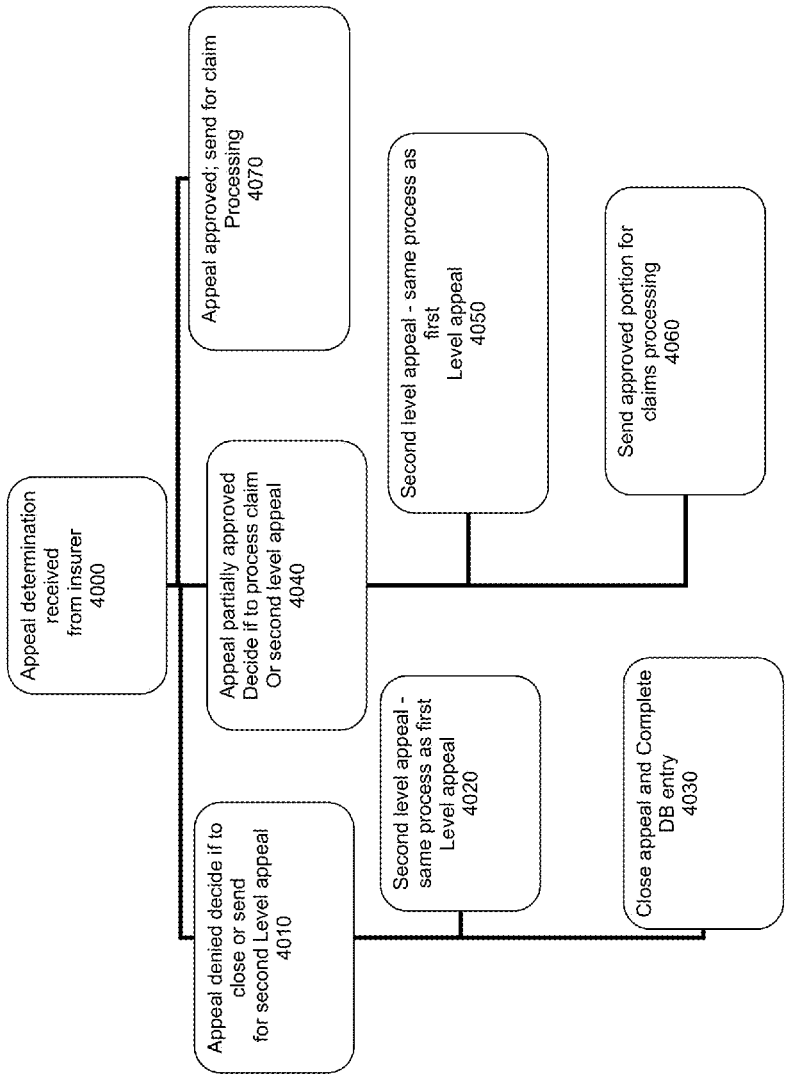
FIG. 4 illustrates the appeals decision matrix in accordance with an exemplary embodiment of the claimed invention.

In accordance with an exemplary embodiment of the claimed invention, the appeals decision matrix process is now described in conjunction with FIG. 4. The appeals decision matrix module 400 reviews the appeal determination in accordance with the appeals decision matrix comprising a plurality of variables, including but not limited to the identity of the insurer, claims processing history of the insurer, appeals determination, state regulations, etc. at step 4000. If appeal is denied, a decision is made either to accept the denial and close the appeal or complete a second level appeal to challenge the denial at step 4010. If the appeal is closed, the appeals decision matrix module 400 enters a closure date and the reason for closure into database at step 4030. However, if a decision is made to proceed with a second level appeal, the appeals decision matrix module 400 initiates a process mirroring the initial appeal process at step 4020. Alternatively, if a decision is made to call the insurer 130, then the appeals decision matrix module 400 communicates the appeal information and reason for calling to medical director, who then makes the call to the insurer's medical director.

If the appeal is partially denied, a decision is made whether to accept the partial denial and proceed to claims payment, proceed with a second level appeal to challenge the appeal or call the insurer's medical director to challenge the appeal at step 4040. If partial denial of the appeal is accepted, then the appeals decision matrix module 400 moves the appeal to a claims payment decision matrix module 420 at step 4060. If the decision is made to proceed with a second level appeal, the appeal decision matrix module 400 sends the appeal to the appeals processing and submission process at step 4050, as described herein with steps 2000-2060. Alternatively, if a decision is made to call insurer's medical director, then appeal information and reason for calling are communicated to medical director, who then makes the call to the insurer's medical director. However, if appeal is approved, it is moved to a claims payment decision matrix module 500 at step 4070.

Figure 5:
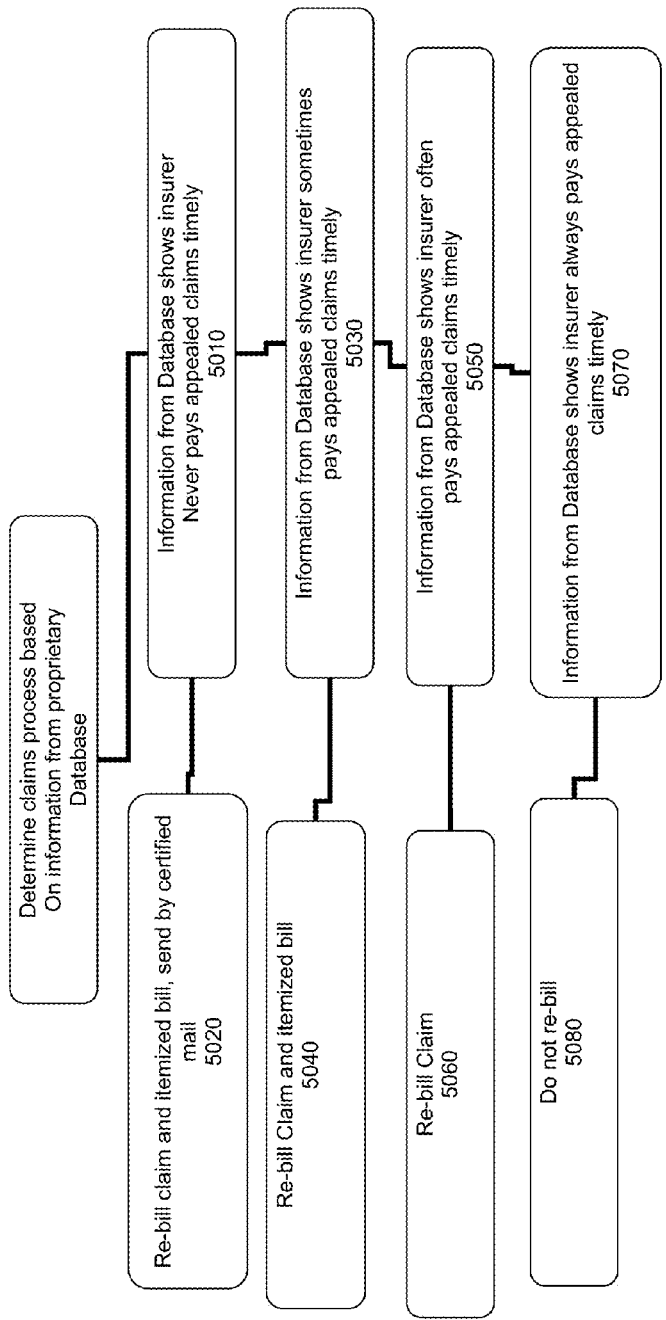
FIG. 5 illustrates the claims process determination matrix in accordance with an exemplary embodiment of the claimed invention.
Figure 6:
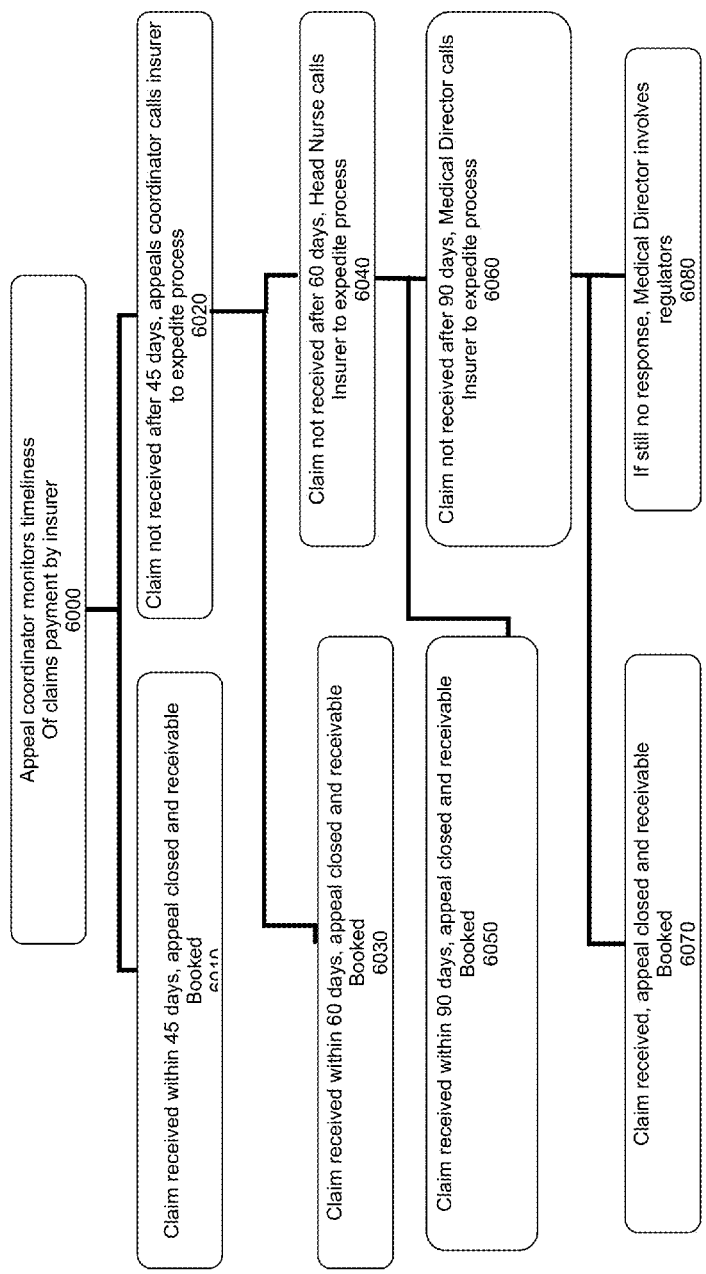
FIG. 6 illustrates the process for managing processing and payment of appeals in accordance with an exemplary embodiment of the claimed invention.

In accordance an exemplary embodiment of the claimed invention, the claims determination process and the process for managing processing and payment of appeals are described in conjunction with FIGS. 5 and 6. The claims payment decision matrix module 500 and claims payment management module 550 monitor the approved appeal to insure timely payment from the insurer 130 to the healthcare provider 110. The claims payment decision matrix module 500 and claims payment management module 550 ensure that the insurer 130 has a clean claim for each approved appeal, as well as tracking the timeliness of payment of each approved appeal. Most states have a 30 day claims payment rule that insurers must abide by.

In accordance with an exemplary embodiment of the claimed invention, the claims payment decision matrix module 500 processes the approved appeals and determines subsequent actions based on the stored information in the database, including but not limited to a past payment history of the insurer 130, the approved amount, insurer's regulatory entity, insurer's policies and procedures, and the timeliness of the claim processing and payment at step 5000. The claims payment decision matrix module 500 can take no action, send a clean universal billing form (UB) or a Center for Medicare and Medicaid Services (CMS) form, send a UB form and an itemized bill, send a UB form and an itemized bill by certified mail. If the claims payment decision matrix module 500 determines that the insurer never pays the appealed claims timely at step 5010, then the claims payment decision matrix module 500 re-bills by preparing and sending a clean UB form and an itemized bill by certified mail to the insurer 130 at step 5020.

However, if the inquiry at step 5010 is answered in the negative, then the claims payment decision matrix module 500 determines if the insurer 130 sometimes pays the appeal claims timely at step 5030. If the inquiry at step 5030 is answered in the affirmative, then the claims payment decision matrix module 500 re-bills by preparing and sending a clean UB form and an itemized bill to the insurer 130 at step 5040. However, if the inquiry at step 5030 is answered in the negative, then the claims payment decision matrix module 500 determines if the insurer 130 often pays the appeal claims timely at step 5050.

If the inquiry at step 5050 is answered in the affirmative, then the claims payment decision matrix module 500 re-bills by preparing and sending a clean UB form to the insurer 130 at step 5060. However, if the inquiry at step 5050 is answered in the negative, then the claims payment decision matrix module 500 determines if the insurer 130 always pays the appeal claims timely at step 5070. If the inquiry at step 5070 is answered in the affirmative, then the claims payment decision matrix module 500 does not re-bill the insurer 130 at step 5080. However, if the inquiry at step 5070 is answered in the negative, then these cases have already been addressed in steps 5000-5060 and the claims payment decision matrix module 500 does nothing.

Turning now to FIG. 6, the appeals coordinator utilizes the claims payment management module 550 and the database to identify any appealed claims not paid within 45 days at step 6000. If the inquiry at step 6000 is answered in the negative, the claims payment management module 550 closes the appeal and payment is recorded or booked at step 6010. However, if the inquiry at step 6000 is answered in the affirmative, the claims payment management module 550 notifies the appeal coordinator, who calls the insurer 130 and confirms clean claim on file, approval on file and confirms payment date at step 6020. If any information is missing, appeal coordinator sends the required information to the insurer 130.

If a claim is identified as being not paid within 60 days, the claims payment management module 550 notifies the appeals coordinator who contacts the chief nurse reviewer or the head nurse at step 6040. The head nurse calls the insurer's appeal supervisor to expedite the payment. However, if a claim is identified as being paid within 60 days, the claims payment management module 500 closes the appeal and payment is recorded or booked at step 6030.

If a claim is identified as being not paid within 90 days, the claims payment management module 550 notifies the appeals coordinator who contacts the medical director at step 6060. The medical director calls the insurer's medical director to expedite the payment. However, if a claim is identified as being paid within 90 days, the claims payment management module 550 closes the appeal and payment is recorded or booked at step 6050.

If a payment is finally received after contacting the insurer's medical director, the claims payment management module 550 closes the appeal and payment is recorded or booked at step 6070. However, if no payment is received from the insurer 130 after contacting the insurer's medical director, then the medical director contacts the state insurance regulators at step 6080.

In accordance with an exemplary embodiment of the claimed invention, the claimed system and method aids healthcare providers in recovering on unpaid claims by significantly increasing the success rate of appeals for claims that are denied. The claimed system and method comprises a denial reduction program module 600 that enables the system provider and/or operator to develop a customized denial reduction program for healthcare providers 110 on an individual basis, in order to reduce the number of denials received and reduce the appeals burden on the healthcare provider 110. The database captures all information related to each denial received. By trending and analyzing this information stored in the database, the denial reduction program module 600 can develop a customized denial reduction program for individual healthcare providers based on the particular needs of the provider. The program is implemented with the healthcare provider and results are monitored with by the claimed invention.

In accordance with an exemplary embodiment of the claimed invention, the medical director and data analysts utilize the denial reduction program module 600 and the database to develop and generate denial reports in conjunction with the healthcare provider 110, nurse reviewer and appeals coordinator at step 7000. The medical director utilizes the denial reports to examine and analyze the denials by insurer, physician, denial type and/or diagnosis. The data is analyzed to identify key drivers of denial activity. Medical director and healthcare provider representatives review the data and strategies that are developed by the denial reduction program module 600 to decrease denials, which are implemented and monitored by the system. The system provides regular reports, including but not limited to status reports, to the healthcare provider 110. It is appreciated that the system provider and/or healthcare provider provides focused education and seminar to healthcare provider's staff to successfully implement the program. The process feedback and improvement module 650 reviews and analyzes the denials by physician and diagnosis to determine potential intervention points to reduce such denials at step 7010. The medical director and healthcare provider representatives review the data and analysis and utilize the denial reduction program module 600 to develop and implement direct, indirect, prospective, concurrent and retroactive interventional programs to reduce the incidence of such denials at step 7020. The process feedback and improvement module 650 measures developed program results and provides feedback, e.g., reports, to the medical director and the healthcare provider 110 at step 7030.

In accordance with an exemplary embodiment of the claimed invention, the denial reduction program module 600 reviews and analyzes the denials by service type and/or timeliness of service provided to determine potential intervention points and/or identify appeals process inefficiencies at step 7040. The medical director and healthcare provider representatives review the data and analysis and utilize the process feedback and improvement module 650 to identify appeals process inefficiencies in terms of dollars resulting from such denials and develop programs to improve process efficiencies at step 7050. The process feedback and improvement module 650 performs a cost benefit analysis of implementing such process improvement programs at step 7060.

In accordance with an exemplary embodiment of the claimed invention, the denial reduction program module 600 reviews administrative denials and performs root cause analysis on such denials at step 7070. The medical director and healthcare provider representatives review the data and analysis and utilize the denial reduction program module 600 to develop and implement programs/strategies to minimize administrative denials at step 7070.

Figure 7:
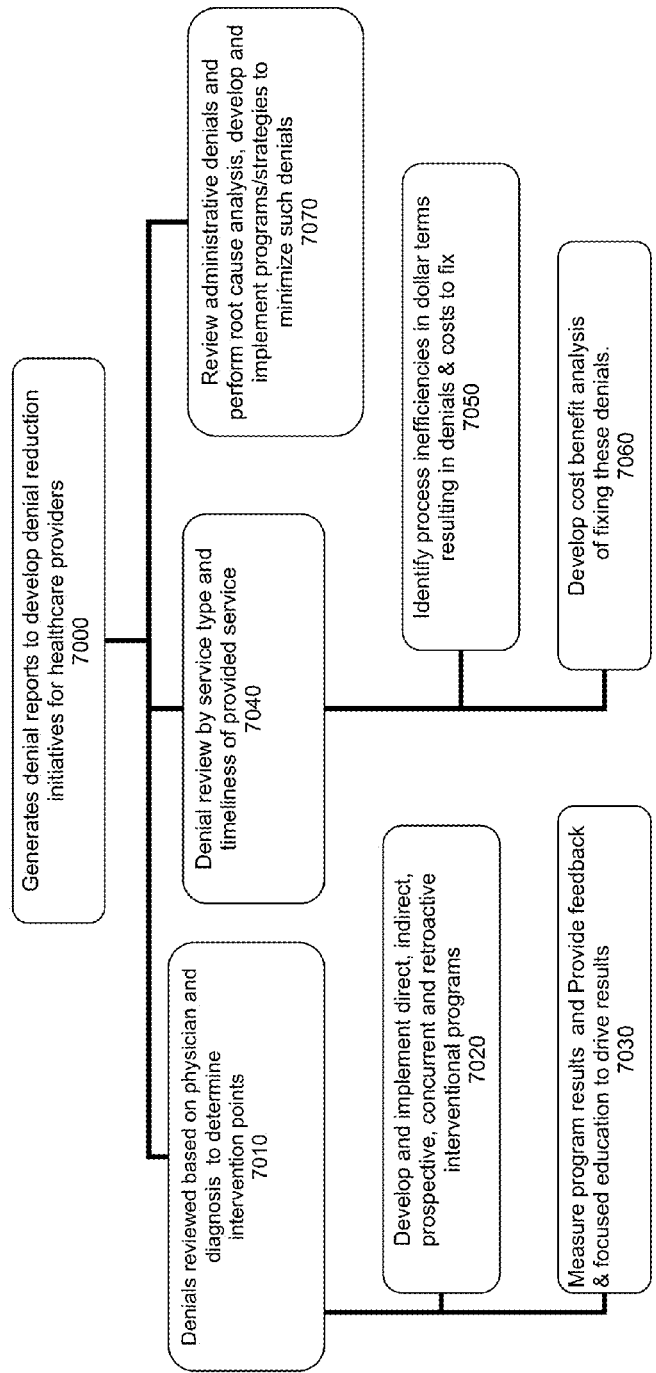
FIG. 7 illustrates the process for reducing denials in accordance with an exemplary embodiment of the claimed invention.
Figure 8:
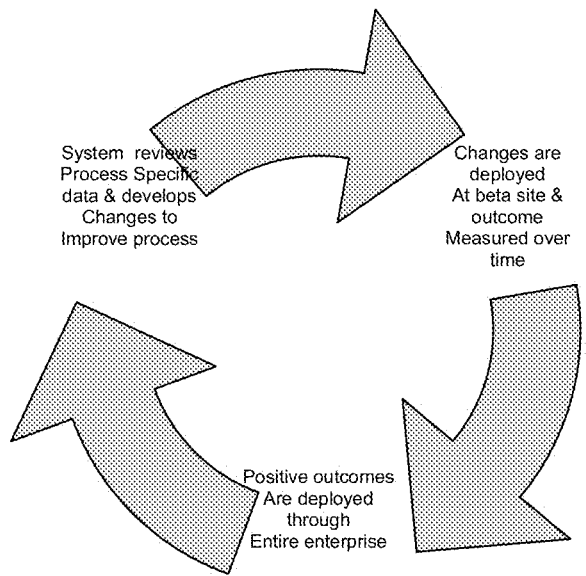
FIG. 8 illustrates the process for improving the appeals and claims processing in accordance with an exemplary embodiment of the claimed invention.

In accordance with an exemplary embodiment of the claimed invention, FIG. 8 illustrates the process of managing appeals by the inventive system and method. The system and method identifies appeals process inefficiencies and intervention points to reduce potential denials as depicted in FIG. 7. The system reviews process specific data and develops changes to improve the appeals process. The changes are then deployed at best site and the outcomes are measured over time. Those changes with positive outcomes are then deployed through the entire enterprise.

Although the claimed invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described herein. As one of ordinary skill in the art will readily appreciate from the disclosure of the claimed invention, processes, machines, manufacture, compositions of matter, means, methods, or steps, presently existing or later to be developed that perform substantially the same function or achieve substantially the same result as the corresponding embodiments described herein may be utilized according to the claimed invention. Accordingly, the appended claims are intended to include within their scope such processes, machines, manufacture, compositions of matter, means, methods, or steps.

The invention claimed is:

1. A web-based method for managing insurance claim denials for a plurality of healthcare providers, comprising the steps of:
   comparing a claim denial of a healthcare provider to a denial status grid comprising a list of denial types and an appeal success rate for each denial type on the list by a review module of a server, wherein said review module provides a recommendation to proceed with or to decline to proceed with an appeal of the claim denial based on the comparison and a patient record associated with said claim denial;
   determining to proceed with the appeal of the claim denial based on the recommendation;
   preparing an appeals package comprising an appeals overturn letter and a supporting document in support of said appeal to said claim denial by said review module of said server;
   submitting said appeals package to an insurer associated with said claim denial by an appeals coordinating module of said server over said communications network to file said appeal to said claim denial;
   monitoring the progress of said appeal filed with said insurer by a process management module of said server;
   processing an appeal determination received from the insurer; and
   determining by an appeals decision matrix module of said server to file a second level appeal when said appeal is denied or partially denied.

2. The method of claim 1, wherein the step of monitoring further comprises the step of escalating said appeal by said process management module of said server for said appeal determination not received within a predetermined time from the insurer.

3. The method of claim 1, further comprising the step of resubmitting said appeals package based on the insurer's response to inquiries about a confirmation of receipt of said appeals package in support of said appeal by said appeals coordinating module of said server.

4. The method of claim 1, wherein the step of processing said appeal determination comprises the steps of comparing a denied or partially denied appeal to an appeal decision matrix by said appeals decision matrix module of said server; and determining whether to file a second level appeal to the insurer.

5. The method of claim 4, further comprising the step of updating said appeal decision matrix based on a claim denial information.

6. The method of claim 1, wherein the step of processing said appeal determination further comprises the step of processing, by a claims payment decision matrix module, a claim of said appeal approved or of said appeal partially denied by the insurer.

7. The method of claim 1, further comprising the steps of storing said claim denial, said patient medical record, said appeals package and said appeal determination in a database; and analyzing claim denials stored in the database by physician, diagnosis, service type, timeliness of provided service to identify process inefficiencies and a cause of denial activity by a denial reduction program module of said server.

8. The method of claim 1, further comprising the step of receiving said claim denial from the insurer over the communications network.

9. The method of claim 1, further comprising the step of retrieving said claim denial from the insurer's computer system over the communications network.

10. The method of claim 1, further comprising the step of receiving the patient record associated with said claim denial from a client device associated with the healthcare provider over the communications network.

11. A web-based computer system for managing insurance claim denials over a communications network, comprising:
   a hardware server for managing claim denials for a plurality of healthcare providers and comprising:
      a review module for comparing a claim denial of a healthcare provider to a denial status grid comprising a list of denial types and an appeal success rate for each denial type on the list, providing a recommendation to proceed with or to decline with an appeal of said claim denial based on the comparison and a patient record associated with said claim denial, wherein a determination to proceed with the appeal of said claim denial is based on the recommendation, preparing an appeals package comprising an appeals overturn letter and a supporting document in support of said appeal to said claim denial;
      an appeals coordinating module for submitting said appeals package to an insurer associated with said claim denial over said communications network to file said appeal of said claim denial;
      a managed care organization (MCO) process management module for monitoring the progress of said appeal filed with the insurer; and
      an appeal decision matrix module for processing appeal determination received from said insurer and determining whether to file a second level appeal when said appeal is denied or partially denied;
   a database for storing said claim denial, said patient medical record, said appeals package and said appeal determination; and
   a plurality of processor based client devices to access the server over the communications network, each client device associated with a health care provider.

12. The computer system of claim 11, wherein said MCO process management module escalates said appeal for said appeal determination not received within a predetermined time from said insurer.

13. The computer system of claim 11, wherein said appeals coordinating module resubmits said appeals package based on the insurer's response to inquiries about a confirmation of receipt of said appeal in support of said appeal.

14. The computer system of claim 11, wherein said appeal decision matrix module compares a denied or partially denied appeal to an appeal decision matrix; and determines whether to file a second level appeal to said insurer.

15. The computer system of claim 11, wherein said appeal decision matrix module updates said appeal decision matrix based on a claim denial information.

16. The computer system of claim 11, further comprising a claims payment decision matrix module for processing a claim of said appeal approved or partially denied by the insurer.

17. The computer system of claim 11, further comprising a denial reduction program module for analyzing claim denials stored in said database by physician, diagnosis, service type, timeliness of provided service to identify process inefficiencies and a cause of denial activity.

18. The computer system of claim 11, wherein the review module receives said claim denial from the insurer over the communications network.

19. The computer system of claim 11, wherein the review module retrieves said claim denial from the insurer's computer system over the communications network.

20. The computer system of claim 11, wherein the review module receives the patient record associated with said claim denial from a client device associated with the healthcare provider over the communications network.

\* \* \* \* \*